United States Patent
Decker

[11] 3,909,667
[45] Sept. 30, 1975

[54] ELECTRONIC FLASH APPARATUS

[75] Inventor: Hans-Heino Decker, Vechelde, Germany

[73] Assignee: Rollei-Werke Franke & Heidecke, Braunschweig, Germany

[22] Filed: Jan. 29, 1974

[21] Appl. No.: 437,672

[30] Foreign Application Priority Data
Feb. 7, 1973 Germany.......................... 2305782

[52] U.S. Cl............. 315/241 P; 315/151; 315/156; 315/159
[51] Int. Cl.². .................. H05B 41/32; H05B 41/36
[58] Field of Search .......... 315/149, 151, 156, 158, 315/159, 241 R, 241 P

[56] References Cited
UNITED STATES PATENTS
3,808,500 4/1974 Ludloff................ 315/241 P X
3,809,951 5/1974 Vital et al. ................ 315/149

Primary Examiner—James W. Lawrence
Assistant Examiner—E. R. LaRoche
Attorney, Agent, or Firm—Stonebraker, Shepard & Stephens

[57] ABSTRACT

Electronic flash apparatus for photographic purposes, in which the duration of the flash is automatically regulated in accordance with the quantity of light reflected from the subject being photographed. The discharge of the flash tube is controlled by a thyristor in series with the flash tube. The circuit is so arranged that the voltage drop occurring in the discharge section of the flash tube when the tube is ignited, causes the thyristor to become conductive, so that the current from the usual storage capacitor can flow through the flash tube and through the thyristor in series with it, to provide the desired flash. The flash is terminated, when a measuring and integrating device receives sufficient light reflected from the subject being photographed, by a surge of commutating or counter current through the flash tube and its series thyristor, this surge being produced in part by an impedance or choke and an associated capacitor and second thyristor, the control grid or gate of the second thyristor being connected to the measuring and integrating device.

4 Claims, 1 Drawing Figure

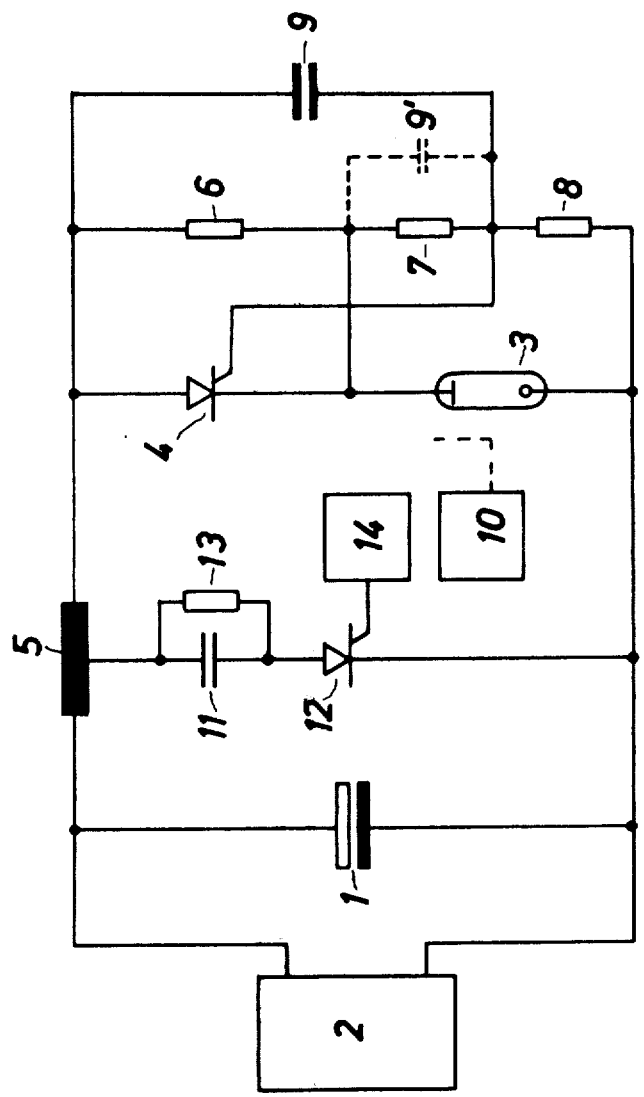

ELECTRONIC FLASH APPARATUS

BACKGROUND OF THE INVENTION

This invention relates to an electronic flash apparatus for photographic purposes, in which the duration of the flash is automatically regulated in accordance with the quantity of light reflected from the subject being photographed, and in which the discharge of the flash tube is controlled by a thyristor situated in the discharge current circuit.

Various forms of electronic flash apparatus of this general type are known in the art. In one known type of such apparatus, the thyristor situated in the flash tube discharge circuit is ignited simultaneously with the flash tube, by an impulse generated in an ignition apparatus when the synchronous contacts of the associated camera shutter are closed, and is extinguished by automatic commutation as soon as the associated measuring device emits a blocking signal. Experience indicates that this simultaneous ignition of flash tube and thyristor involves considerable outlay on switching apparatus, as demonstrated, for example, by the construction of a circuit of this kind as shown in FIG. 3 of German published patent application (Offenlegungsschrift) No. 1,911,832.

The object of the present invention is to provide an improved and more satisfactory form of electronic flash apparatus of the general type above mentioned, the improved apparatus being designed in such a way that as few switching elements as possible are needed in order to make certain that the thyristor ignition will take place reliably.

SUMMARY OF THE INVENTION

The invention enables the above mentioned object to be achieved as a result of the fact that the voltage drop occurring in the discharge section of the flash tube, upon the ignition of the flash tube, will cause the thyristor to open.

In a particularly advantageous manner, the thyristor is then connected into the discharge current circuit of the flash tube in such a way that immediately on the ignition of the flash tube, its cathode potential is lowered or reduced to a value lower than the control grid potential, which has been reduced to the extent of the ignition voltage.

In one form of the invention, the cathode of the tyristor which controls the flow of current through the flash tube is directly connected to the anode of the flash tube, while the control grid of this thyristor is connected to the lower potential of a capacitor, which potential is higher than the cathode potential of the flash tube by at least the sum of the maintaining voltage of the flash tube plus the ignition voltage of the thyristor.

The thyristor is then preferably wired up with a shunt, while its control grid is connected between two resistors which form a series connection in parallel with the flash tube, a capacitor being connected in parallel to the shunt and to the resistor, which is in parallel with the ignition section of the thyristor. This system offers the advantage that the ignition section of the thyristor will always be subjected to a negative voltage which reliably locks the thyristor except at the moment of ignition.

BRIEF DESCRIPTION OF THE DRAWING

The single view is a schematic wiring diagram of flash apparatus in accordance with a preferred embodiment of the invention.

DESCRIPTION OF THE PREFERRED EMBODIMENT

In the preferred arrangement, a main storage capacitor 1 is charged up to the desired operating voltage by any suitable source of direct current, such as the d.c. converter 2. Arranged in parallel with the capacitor 1 is a flash tube 3 connected in series with the first thyristor 4 which controls the discharge of the flash current, the cathode of the thyristor being directly connected to the flash tube. A choke or impedance 5 is arranged as shown, in the connection from the storage capacitor 1 to the anode of the thyristor 4.

A shunt resistor 6 is arranged in parallel with the thyristor 4, and two resistors 7 and 8, in series with each other and constituting a voltage divider, are arranged in parallel with the flash tube 3, as illustrated. The control grid of the thyristor 4 is connected to the intermediate junction between the resistors 7 and 8. A capacitor 9 is arranged in parallel with the resistors 6 and 7, as shown.

The flash tube 3 is ignited by an ignition device 10 of conventional form. The details of the ignition device are not important for purposes of the present invention, and may be varied within the skill of the art. Merely as one example of an ignition device which may be used, reference may be made to Krusche and Rohmann U.S. Pat. No. 3,585,442, granted June 15, 1971, in which see the parts 8, 9, 10, 11, and 12 which together form an ignition device for igniting the flash tube 13 of that patent. The ignition device 10 emits an ignition impulse upon the closing of the conventional flash synchronizer contacts of the camera shutter in the camera with which this flash apparatus is used, and this ignition impulse serves to ionize the flash tube 3 in the usual way, to initiate the flash.

Arranged in parallel with the storage capacitor 1 and also in parallel with the flash tube 3 and first thyristor 4, is a series circuit comprising a capacitor 11 and a second thyristor 12. One end of this series circuit is connected to an intermediate tap on the choke or impedance 5. A resistor 13 is arranged as shown, in parallel with the capacitor 11. This second thyristor 12 has its gate or control grid connected to a photoelectric measuring device indicated schematically at 14, of well known kind. This device measures the light flux reflected from the subject being photographed, and emits a signal to the control grid of the thyristor 12, when the integrated light flux reaches the threshold value required for correct exposure of the photographic film. Various forms of such measuring and integrating devices are known in the art, and any suitable form may be used in the present construction, the details of the measuring and integrating device being unimportant for purposes of the present invention.

The flash apparatus of the present invention operates as follows:

The storage capacitor 1 is charged up to the working voltage by the direct current converter 2 or other suitable source. The capacitor 9 is simultaneously charged, but to a lower voltage, corresponding to the voltage drop across the resistors 6 and 7. The main electrodes of the flash tube 3 are subject to almost the complete working voltage, while the anode and the cathode of the first thyristor 4 are subject to a potential which is lower than the full working voltage by the amount of the voltage drop in the resistor 6. The voltage on the control grid or gate of the thyristor 4 is lower than its cathode potential by the amount of the voltage drop in the resistor 7, so that the thyristor 4 is blocked or non-conducting.

When the camera shutter is operated to close the synchronizer contacts (not shown) this produces, in the conventional ignition device 10, a trigger pulse which ionizes the discharge section of the flash tube 3. The voltage prevailing across the terminals of the flash tube is thereby considerably reduced, as a result of which the potential in the cathode of the thyristor 4 is likewise decreased. If the resistors 6, 7, and 8 are so dimensioned that the lower potential of the capacitor 9 (i.e., the potential at the connection point of the resistors 7 and 8) exceeds the now lowered cathode potential of the thyristor 4 by the ignition voltage of the thyristor, then a positive potential difference will occur between the control grid or gate of the thyristor and its cathode, since first of all the potential of the control grid is maintained by the capacitor 9. The necessary ignition voltage thus prevails in the ignition section of the thyristor, and the thyristor cuts through or becomes conductive. The storage capacitor 1 can then discharge across the thyristor 4 and the flash tube 3.

The light emitted by the flash tube 3 is reflected from the subject being photographed, and reaches the photosensitive switching element of the measuring device 14. When the light flux perceived by the measuring device 14 reaches the required integrated value needed for proper exposure, the device 14 will emit an ignition impulse to the gate or control grid of the second thyristor 12. The electrodes (anode and cathode) of this thyristor 12 will always be subjected to the same voltage as that of the capacitor 1, since the capacitor 11 is short circuited through the resistor 13, and the voltage drop in the choke or impedance 5 is negligible. Hence as a result of the ignition impulse delivered by the measuring device 14 to the control grid of the thyristor 12, this second thyristor cuts through or becomes conductive. As the voltage in the capacitor 11 is still zero when the thyristor 12 ignites or becomes conductive, the left hand half of the impedance 5 will be subjected to the whole of the voltage prevailing in the storage capacitor 1. This voltage is induced, on the transformer principle, in the right hand half of the impedance 5, where it generates a quenching current surge through the capacitor 11, the second thyristor 12, the flash tube 3, and the cathode-anode section of the first thyristor 4.

The current flowing the current section of the first thyristor 4 thus becomes zero or negative. The charge carriers in the p-layer of this thyristor are discharged, and the thyristor is triggered into the blocking or non-conducting state. The flash discharge through the tube 3 is thus interrupted.

To insure a reliable blocking of the thyristor 4, this counter-current in the quenching circuit must be maintained until all charge carriers in the blocking layers of this thyristor have been discharged. This so-called release time can be reduced if, in the quenching of the thyristor, its control grid or gate is additionally subjected to a negative voltage. This is additionally effected by the capacitor 9, which at the moment of quenching has been charged up to the residual charging voltage of the storage capacitor 1, reduced to the extent of the voltage drop in the resistor 8. During the quenching process, the capacitor 9 will be discharged via the resistors 6 and 7, as the voltage in the thyristor 4 becomes zero or negative. The voltage drop in the resistor 7 insures that the cathode potential of the resistor 4 will always be more positive than the control grid potential of this thyristor, and that the voltage prevailing in the ignition section will thus be negative. After the blocking of the thyristor 4, the entire residual charging voltage of the storage capacitor 1 prevails in the thyristor 4, as the time required for the de-ionization of the flash tube 3 is considerably longer than the release time of the thyristor 4. Here again, the repeated ignition of the thyristor 4 is prevented, because its control grid potential is always negative with respect to its cathode potential, owing to the voltage drop in the resistor 7.

Instead of placing the capacitor 9 in the position shown in full lines in the drawing, it may be placed, if desired, directly in parallel with the resistor 7, as shown in broken lines at 9'. However, since the resistor 6 is always given a very high ohmic resistance, this alternative location for the capacitor 9 would have to be done at the price of a comparatively long charging time for this capacitor.

What is claimed is:

1. Electronic flash apparatus for photographic purposes, comprising a flash tube, a thyristor in series with said tube for controlling flow of current through said tube, means for igniting said tube, there being a voltage drop occurring in a discharge section of said flash tube when it is ignited, and means responsive to said voltage drop for causing said thyristor to become conductive so that discharge current may flow through said tube and through said thyristor to create a light flash in said tube, said means for causing said thyristor to become conductive comprising means for supplying said thyristor with a control grid potential which is less than the initial potential applied to the cathode of said thyristor immediately before the ignition of said flash tube, and means effective immediately upon ignition of the flash tube for reducing the cathode potential of said thyristor to a potential sufficiently lower than said control grid potential so that said thyristor becomes conductive.

2. Apparatus as defined in claim 1, further comprising a storage capacitor arranged in parallel with said flash tube and thyristor, integrating measuring means responsive to light reflected from a subject being photographed for producing a termination signal pulse when the integrated reflected light reaches a desired value, and means responsive to said signal pulse for producing a commutating flow of counter-current in said flash tube and thyristor, to cause said thyristor to become non-conductive and to extinguish the flash in said flash tube, said last named means comprising an impedance arranged in a connection between said storage capacitor and said flash tube and thyristor, said impedance having an intermediate tap, a second capacitor (11) and a second thyristor (12) in series with each other and in parallel with said storage capacitor and connected to said tap, a resistor (13) in parallel with said second capacitor (11), and a connection for conveying said termination signal pulse to the control grid of said second thyristor to cause said second thyristor to become conductive, said impedance and second capacitor being so dimensioned and arranged that when said second thyristor becomes conductive, said impedance generates a quenching current surge of commutating counter-current in said flash tube and first thyristor.

3. Apparatus as defined in claim 1, wherein there is a capacitor (9) having a higher potential side and a lower potential side, and the cathode of said thyristor (4) is directly connected with the anode of said flash tube (3), and the control grid of said thyristor is connected to said lower potential side of said capacitor (9), and the potential of said lower potential side exceeds the cathode potential of said flash tube (3) by an amount at least equal to the sum of the maintaining voltage of the flash tube plus the ignition voltage of the thyristor.

4. Apparatus as defined in claim 3, wherein there is a series circuit comprising a first resistor (6), a second resistor (7), and a third resistor (8) in series with each other and in parallel with said flash tube (3) and thyristor (4), and the control grid of said thyristor and the lower potential side of said capacitor (9) are connected to each other and to said series circuit between said second resistor (7) and said third resistor (8), and the cathode of said thyristor and the anode of said flash tube are connected to each other and to said series circuit between said first resistor (6) and said second resistor (7).

* * * * *